Patented Aug. 23, 1938

2,128,109

UNITED STATES PATENT OFFICE 2,128,109

CONDENSED BLENDING AGENT AND LUBRICANT

Peter J. Wiezevich, Elizabeth, N. J., assignor to Standard Oil Development Company, a corporation of Delaware No Drawing. Application September 28, 1934, Serial No. 745,942

12 Claims. (Cl. 87—9)

This invention relates to high molecular weight oils or blending agents for hydrocarbons, and more particularly to high molecular weight condensation products capable of improving the properties of lubricating and other oils.

In U. S. Patent 1,815,022 issued to G. H. B. Davis, a method was disclosed for preparing pour inhibitors by the condensation of long chain aliphatic chlorinated hydrocarbons with aromatic hydrocarbons. This invention covers the production of products having a similar effect, but prepared by the condensation of chlorinated long chain aliphatic compounds, preferably those containing over 10 or 15 carbon atoms, with substituted aromatic or cyclic hydrocarbons; that is, with aromatic or cyclic hydrocarbons containing oxygen, sulfur, and similar non-hydrocarbon elements such as the ethers, thio-ethers, and other similar derivatives. The term "condensation" is employed to denote a chemical reaction of the Friedel and Crafts type, preferably conducted at low temperatures.

It is especially preferred to use oxygenated aromatic compounds, and in particular, the aromatic or cyclic ethers, such as diphenyl oxide, diphenylene-oxide, dicyclohexyl ether, dinaphthyl oxide, butyl phenyl ether, condensed or polymerized diphenyl oxide, and the like. Similar compounds such as those containing sulphur, selenium or tellurium may be used in addition to or substituted for the oxygen-containing compounds mentioned above. The above compounds may be described as ethers having at least one cyclic hydrocarbon radical and are described by the following formula: R—X—R', where R is a hydrocarbon radical which may either be cyclic or open chain. R' is a cyclic hydrocarbon radical and X is a negative element of the 6th group of the periodic table.

In the preferred method of producing these blending agents, paraffin wax or any other long chain aliphatic compound capable of condensing with aromatics is halogenated to a chlorine or other halogen content of approximately 8 to 15% or more. This product is then dissolved with an equivalent amount of a substituted aromatic compound of the class described above in an inert solvent such as hydrogenated or aluminum chloride treated heavy naphtha, and the mixture is treated with aluminum chloride or other similar condensing agent, and the temperature is maintained below about 70° C. and preferably from 20° to 35° C. After about 5 hours reaction time, the mixture is hydrolyzed with water, alcohol or other suitable hydrolyzing agent, in order to remove the aluminum chloride, and the solvent is distilled off and the residue reduced to 600° F. to remove unreacted wax; the fixed chlorine may be removed by steam distillation, heating with sodium, etc., then the residue can be employed as such as a lubricant or as a blending agent in lubricants or fuels. In many cases, the crude hydrolyzed product is sufficiently satisfactory so as to dispense with the de-chlorinating step.

If a more potent product is desired, it may be concentrated by precipitation of the more active high molecular constituents by means of hot alcohols, ketones, light hydrocarbons which dissolve the inactive ingredients.

Various modifications of the method of reacting these materials are possible. For instance, the chlorinated aliphatic compound and the oxygenated aromatic hydrocarbon may be heated first for about 1–4 hours at 130–140° F. before the addition of aluminum chloride. Furthermore, instead of employing the Friedel and Crafts reaction, a Wurtz synthesis of the chlorinated aliphatic compound with the chlorinated oxy-aromatic may be carried out in presence of sodium, or a combination of Wurtz and Friedel and Crafts may be employed, the former generally being preferred for final condensation.

In all of these reactions, the purpose is to condense the substituted aromatic compound with the chlorinated long chain aliphatic compound to produce a high molecular weight substantially non-volatile compound containing oxygen or some other substituent besides carbon and hydrogen. It is preferable to produce condensation products having a molecular weight well above about 1000 or 2000 or higher. The substituent, such as oxygen, is preferably present in the product to the extent of 2 to 5 to 10 to 20% or more.

One of the most valuable properties possessed by the products obtained according to this invention is their ability to lower the pour points of oils containing suspended solids of the wax type. For this purpose the condensation product is added to the oil in concentrations of 0.01 to 0.5 to 1 or 5% or more, depending upon the strength of the pour inhibitor. This pour inhibiting property is especially marked in the case of the high molecular weight viscous non-volatile residue, while the lower molecular weight extracts or volatile components are most advantageously employed as lubricants.

The product prepared according to this invention also possesses exceptionally good lubricating and other similar properties making it very suitable as a lubricant, cable oil, transformer oil, dewaxing aid, and as a constituent in textile or soluble oils, and the like. It is obtained from the reaction mixture as a light colored, clean oil, differing in this respect from most condensation products of this type.

It also may be employed together with any or all of the following types of blending agents: Polymer thickeners capable of raising the viscosity and/or viscosity index of oils, bright stocks and other residuals, pour inhibitors such as Paraflow, oxidation inhibitors such as alpha naphthol, aromatic amines, sulfur and sulfur compounds, etc.; oiliness agents, as, for example, oxidized wax, synthetic esters, etc.; oil soluble and insoluble soaps, extreme pressure lubricating agents, oil soluble resins, sludge dispersing agents such as condensation products of petrolatum wax with naphthalene, etc.; metallo-organic compounds, dyes, cellulose derivatives, volatilized products, and the like.

The condensation products obtained according to this invention may be added to crude petroleum and its fractions, either waxy or dewaxed, lubricating oils either partially or highly refined, hydrogenated oils, aluminum chloride treated oils, solvent extracted oils, white oils, synthetic oils, greases, volatilized oils, glyceride oils, oils derived from coal, lignite, peat, and the like. They may also be used as or in top cylinder lubricants, and as blending agents in fuels and light distillates.

The following example will illustrate some of the many phases of this invention:

*Example*

400 gms. of chlorinated paraffin containing 11% chlorine was condensed with 60 gms. of diphenyl oxide in presence of 10 gms. of aluminum chloride while in solution in 300 gms. of heavy naphtha. The temperature was maintained at 32° C. for 5 hours, and upon hydrolysis of the reaction mixture with water, and distillation of the solvent, a residual oil was recovered having a molecular weight of approximately 500 and containing about 3% oxygen. This product had a viscosity of 211 seconds Saybolt at 210° F. and a viscosity index of 117, and lowered the pour of a waxy petroleum lubricating oil from 30° to 5° F. in 1% concentration.

Although I have shown and described certain specific embodiments of my invention, I am aware that many modifications thereof are possible. My invention, therefore, is not to be restricted except insofar as is necessitated by the prior art and by the spirit of the appended claims.

I claim:

1. An improved lubricating oil of low pour point comprising a waxy hydrocarbon oil and a small quantity of a polymer condensation product of a waxy hydrocarbon and an ether containing at least one cyclic hydrocarbon radical.

2. A lubricating oil according to claim 1 in which the condensation product is obtained from an ether having at least one aromatic radical.

3. A lubricating oil according to claim 1 in which the condensation product is obtained from a dicyclo ether.

4. A lubricating oil according to claim 1 in which the condensation product is obtained from a dicyclo aromatic ether.

5. A lubricating oil according to claim 1 in which the condensation product is obtained from diphenyl ether.

6. A lubricating oil according to claim 1 in which the condensation product is obtained from diphenylene oxide.

7. A lubricating oil of low pour point comprising a waxy hydrocarbon oil and a small quantity of a condensation product of an aliphatic organic compound having a chain of at least 10 carbon atoms and a thio ether containing at least one cyclic radical.

8. A lubricating oil according to claim 7 in which a dicyclic thio ether is used.

9. A lubricating oil according to claim 7 in which a dicyclo aromatic ether is used.

10. A lubricating oil according to claim 7 in which diphenylene thio ether is used.

11. A lubricating oil of low pour point, comprising a viscous waxy hydrocarbon oil and a small quantity of a polymer-condensation product obtained by the union of a long chain aliphatic hydrocarbon with an ether-like substance of the following formula: $R-X-R^1$, where $R$ is a hydrocarbon radical, $R^1$ is a cyclic hydrocarbon radical and $X$ is an element selected from the sixth group of the periodic table of elements consisting of oxygen, sulfur, selenium and telurium.

12. A lubricating oil as specified in claim 11 wherein the long chain aliphatic hydrocarbon has at least ten carbon atoms.

PETER J. WIEZEVICH.

CERTIFICATE OF CORRECTION.

Patent No. 2,128,109.                          August 23, 1938.

It is hereby certified that the name of the inventor in the above numbered patent was erroneously described and specified as Peter J. Wiezevich, whereas said name should have been described and specified as Peter J. Wiezevich, of Elizabeth, New Jersey, now by change of name Peter John Gaylor, as shown by the record of assignments in this office; and that the said Letters Patent should be read with this correction therein that the same may conform to the record of the case in the Patent Office.

Signed and sealed this 11th day of October, A. D. 1938.

Henry Van Arsdale (Seal)                                      Acting Commissioner of Patents.

waxing aid, and as a constituent in textile or soluble oils, and the like. It is obtained from the reaction mixture as a light colored, clean oil, differing in this respect from most condensation products of this type.

It also may be employed together with any or all of the following types of blending agents: Polymer thickeners capable of raising the viscosity and/or viscosity index of oils, bright stocks and other residuals, pour inhibitors such as Paraflow, oxidation inhibitors such as alpha naphthol, aromatic amines, sulfur and sulfur compounds, etc.; oiliness agents, as, for example, oxidized wax, synthetic esters, etc.; oil soluble and insoluble soaps, extreme pressure lubricating agents, oil soluble resins, sludge dispersing agents such as condensation products of petrolatum wax with naphthalene, etc.; metallo-organic compounds, dyes, cellulose derivatives, volatilized products, and the like.

The condensation products obtained according to this invention may be added to crude petroleum and its fractions, either waxy or dewaxed, lubricating oils either partially or highly refined, hydrogenated oils, aluminum chloride treated oils, solvent extracted oils, white oils, synthetic oils, greases, volatilized oils, glyceride oils, oils derived from coal, lignite, peat, and the like. They may also be used as or in top cylinder lubricants, and as blending agents in fuels and light distillates.

The following example will illustrate some of the many phases of this invention:

*Example*

400 gms. of chlorinated paraffin containing 11% chlorine was condensed with 60 gms. of diphenyl oxide in presence of 10 gms. of aluminum chloride while in solution in 300 gms. of heavy naphtha. The temperature was maintained at 32° C. for 5 hours, and upon hydrolysis of the reaction mixture with water, and distillation of the solvent, a residual oil was recovered having a molecular weight of approximately 500 and containing about 3% oxygen. This product had a viscosity of 211 seconds Saybolt at 210° F. and a viscosity index of 117, and lowered the pour of a waxy petroleum lubricating oil from 30° to 5° F. in 1% concentration.

Although I have shown and described certain specific embodiments of my invention, I am aware that many modifications thereof are possible. My invention, therefore, is not to be restricted except insofar as is necessitated by the prior art and by the spirit of the appended claims.

I claim:

1. An improved lubricating oil of low pour point comprising a waxy hydrocarbon oil and a small quantity of a polymer condensation product of a waxy hydrocarbon and an ether containing at least one cyclic hydrocarbon radical.

2. A lubricating oil according to claim 1 in which the condensation product is obtained from an ether having at least one aromatic radical.

3. A lubricating oil according to claim 1 in which the condensation product is obtained from a dicyclo ether.

4. A lubricating oil according to claim 1 in which the condensation product is obtained from a dicyclo aromatic ether.

5. A lubricating oil according to claim 1 in which the condensation product is obtained from diphenyl ether.

6. A lubricating oil according to claim 1 in which the condensation product is obtained from diphenylene oxide.

7. A lubricating oil of low pour point comprising a waxy hydrocarbon oil and a small quantity of a condensation product of an aliphatic organic compound having a chain of at least 10 carbon atoms and a thio ether containing at least one cyclic radical.

8. A lubricating oil according to claim 7 in which a dicyclic thio ether is used.

9. A lubricating oil according to claim 7 in which a dicyclo aromatic ether is used.

10. A lubricating oil according to claim 7 in which diphenylene thio ether is used.

11. A lubricating oil of low pour point, comprising a viscous waxy hydrocarbon oil and a small quantity of a polymer-condensation product obtained by the union of a long chain aliphatic hydrocarbon with an ether-like substance of the following formula: $R-X-R^1$, where $R$ is a hydrocarbon radical, $R^1$ is a cyclic hydrocarbon radical and $X$ is an element selected from the sixth group of the periodic table of elements consisting of oxygen, sulfur, selenium and telurium.

12. A lubricating oil as specified in claim 11 wherein the long chain aliphatic hydrocarbon has at least ten carbon atoms.

PETER J. WIEZEVICH.

CERTIFICATE OF CORRECTION.

Patent No. 2,128,109.             August 23, 1938.

It is hereby certified that the name of the inventor in the above numbered patent was erroneously described and specified as Peter J. Wiezevich, whereas said name should have been described and specified as Peter J. Wiezevich, of Elizabeth, New Jersey, now by change of name Peter John Gaylor, as shown by the record of assignments in this office; and that the said Letters Patent should be read with this correction therein that the same may conform to the record of the case in the Patent Office.

Signed and sealed this 11th day of October, A. D. 1938.

Henry Van Arsdale (Seal)                            Acting Commissioner of Patents.